(12) United States Patent
Keen et al.

(10) Patent No.: US 8,799,507 B2
(45) Date of Patent: Aug. 5, 2014

(54) LONGEST PREFIX MATCH SEARCHES WITH VARIABLE NUMBERS OF PREFIXES

(75) Inventors: John Keen, Mountain View, CA (US); Jean-Marc Frailong, Los Altos Hills, CA (US); Deepak Goel, Sunnyvale, CA (US); Srinivasan Jagannadhan, Sunnyvale, CA (US); Srilakshmi Adusumalli, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 249 days.

(21) Appl. No.: 13/418,907

(22) Filed: Mar. 13, 2012

(65) Prior Publication Data

US 2013/0246651 A1 Sep. 19, 2013

(51) Int. Cl.
*G06F 15/173* (2006.01)

(52) U.S. Cl.
USPC .......................................... 709/238; 370/351

(58) Field of Classification Search
None
See application file for complete search history.

(56) References Cited

U.S. PATENT DOCUMENTS

| | | | |
|---|---|---|---|
| 6,768,739 B1 | 7/2004 | Kobayashi et al. | |
| 7,738,454 B1 * | 6/2010 | Panwar et al. | 370/389 |
| 8,005,868 B2 | 8/2011 | Saborit et al. | |
| 8,018,940 B2 | 9/2011 | Hao et al. | |
| 2005/0195832 A1 * | 9/2005 | Dharmapurikar et al. | 370/395.31 |
| 2009/0182726 A1 | 7/2009 | Wang | |
| 2009/0228433 A1 | 9/2009 | Aguilar Saborit et al. | |
| 2010/0040066 A1 * | 2/2010 | Hao et al. | 370/395.31 |
| 2010/0098081 A1 | 4/2010 | Dharmapurikar et al. | |
| 2010/0284405 A1 | 11/2010 | Lim | |
| 2012/0117319 A1 * | 5/2012 | Slavin | 711/108 |
| 2013/0031229 A1 * | 1/2013 | Shiga et al. | 709/223 |

OTHER PUBLICATIONS

Extended European Search Report mailed Jul. 22, 2013 in corresponding EP Application No. 13157924.5, 6 pgs.
U.S. Appl. No. 13/194,571, by Scott Mackie, filed Jul. 29, 2011.
U.S. Appl. No. 13/239,774, by John Keen, filed Sep. 22, 2011.
Srinivasan et al, "Fast Address Lookups Using Controlled Prefix Expansion," ACM Transactions on Computer Systems, vol. 17 No. 1, Feb. 1999, 40 pp.
U.S. Appl. No. 12/425,517, by Arun Kumar S P et al., filed Apr. 17, 2009.
U.S. Appl. No. 13/239,915, by John Keen, filed Sep. 22, 2011.
Berenbrink et al., "Balanced Allocations: The Heavily Loaded Case," Siam J. Comput. vol. 35 No. 6, pp. 1350-1385, Aug. 2005.
Kirsch et al., "More Robust Hashing: Cuckoo Hashing With a Stash," Siam J. Comput., vol. 39, 4, pp. 1543-1561, Oct. 2009.

(Continued)

*Primary Examiner* — Moustafa M Meky
*Assistant Examiner* — Clayton R Williams
(74) *Attorney, Agent, or Firm* — Shumaker & Sieffert, P.A.

(57) ABSTRACT

An example network device includes a control plane and a filter lookup module that includes a Bloom filter that supports parallel lookup of a maximum number of different prefix lengths. The filter lookup module accesses the Bloom filter to determine a longest length prefix that matches an entry in a set of prefixes. The control plane receives prefix lengths that include more than the maximum number of different prefix lengths supported by the Bloom filter, wherein the set of prefix lengths is associated with one application, generates, based on the received set of prefix lengths, two or more groups of different prefix lengths, wherein each of the two or more groups of different prefix lengths includes no more than the maximum number of different prefix lengths, and programs the filter lookup module with the two or more groups of different prefix lengths associated with the one application.

20 Claims, 7 Drawing Sheets

(56) References Cited

OTHER PUBLICATIONS

Pagh et al., "Cuckoo Hashing," Preprint submitted to Elsevier Science Dec. 8, 2003, 27 pp.

Panigrahy, "Efficient Hashing with Lookups in two Memory Accesses," found at http://arxiv.org/PS_cache/cs/pdf/0407/0407023v1.pdf, Feb. 1, 2008, 12 pp.

Friedgut et al., "Every Monotone Graph Property Has a Sharp Threshold," American Mathematical Society vol. 124, No. 10, Oct. 1996, 10 pp.

Askitis, "Fast Compact Hash Tables for Integer Keys," presented at the 32nd Australasian Computer Science Conference (ACSC 2009), Wellington, New Zealand, Jan. 2009, 10 pp.

Dharmapurikar et al., "Longest Prefix Matching Using Bloom Filters," IEEE/ACM Transactions on Networking, vol. 14, No. 2, Apr. 2006, 13 pp.

Steger et al., "Balanced Allocations: The Heavily Loaded Case," Powerpoint Presentation, Institut fur Informatik Technische Universitat Munchen, Retrieved on Mar. 1, 2011, 14 pp.

* cited by examiner

LONGEST PREFIX MATCH SEARCHES WITH VARIABLE NUMBERS OF PREFIXES

TECHNICAL FIELD

This disclosure relates to computer networks and, more particularly, to forwarding traffic within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The packets are transmitted between the source device and destination device using intermediate network devices, such as gateways, firewalls, switches and routers. When a network receives an incoming packet or sends an outgoing packet, the network device may apply one or more filters to the packet to perform a defined action on the packet under certain conditions. In order to identify the terms of the filters to apply to a given packet, the network device may extract information from the packet, such as a source or destination Internet Protocol (IP) address, a source or destination port, and protocol. The network device then performs a search of the filter terms installed within the network device to determine whether the extracted information satisfies criteria specified by any of the filter terms.

One conventional approach to identifying matching filter terms to apply to packets includes applying a hash function to at least a portion of the extracted information (i.e., a key) to determine possible locations in a hash table for the extracted information. A key corresponds to a portion of the extracted information having a predefined length (e.g., a prefix of a source or destination IP address). That is, one or more keys are inputted into a hash function to generate one or more possible locations in a hash table. The network device then looks up each possible location in the hash table to determine if the key is found in any of the possible locations. A key is found in the hash table when one or more filter terms are defined for the possible location. According to a longest prefix match algorithm, the router applies the filter terms associated with the longest prefix for which a match is found for the corresponding key in the hash table.

In order to improve the speed at which the network device identifies filter terms to apply to the packets, the network device may be configured to concurrently evaluate multiple different prefix lengths of a particular network address for possible matches with address prefixes in the hash table. However, the number of different prefixes generated from the different prefix lengths that may be evaluated concurrently may be limited by various hardware or software constraints.

SUMMARY

In general, techniques are described for supporting longest prefix matching with a variable number of different prefix lengths while minimizing reduced throughput caused by creating additional prefixes to search by effectively converting shorter prefix lengths into longer prefix lengths when the number of different prefix lengths is greater than the number of prefix lengths that may be evaluated concurrently by hardware or software. For example, techniques of this disclosure enable applications to specify multiple consecutive groups of prefix lengths. That is, rather than creating additional prefixes, techniques of this disclosure maintain the same number of prefixes as the number of prefix lengths and enable the hardware or software performing the searches to iterate through groups of different prefixes generated based on the prefix lengths. Specifically, when searching for the longest prefix that matches the filter criteria, a first group of prefix lengths is searched. If none of the prefix lengths included in the first group of prefix lengths is a match, a second group of prefix lengths is searched. The process continues until either a match is found or all of the groups have been searched for a match and no match is found. The size of each group may be limited to the maximum size supported by the hardware or software used to perform the search.

In one example, a method includes receiving, with a network device, a set of prefix lengths that include a number of different prefix lengths greater than a maximum number of different prefix lengths capable of being looked up in parallel by a Bloom filter of the network device, wherein the set of prefix lengths is associated with one application. The method also includes generating, based on the received set of prefix lengths, two or more groups of different prefix lengths, wherein each of the two or more groups of different prefix lengths includes no more than the maximum number of different prefix lengths, and programming, with a control plane of the network device, a filter lookup module of the network device with the two or more groups of different prefix lengths associated with the one application.

In another example, a network device includes a control plane and filter lookup module, the filter lookup module comprising a Bloom filter. The Bloom filter supports parallel lookup of a maximum number of different prefix lengths, and the filter lookup module accesses the Bloom filter to determine a longest length prefix that matches an entry in a set of prefixes. The control plane is configured to receive a set of prefix lengths that include a number of different prefix lengths greater than the maximum number of different prefix lengths supported by the Bloom filter, wherein the set of prefix lengths is associated with one application, generate, based on the received set of prefix lengths, two or more groups of different prefix lengths, wherein each of the two or more groups of different prefix lengths includes no more than the maximum number of different prefix lengths, and program the filter lookup module with the two or more groups of different prefix lengths associated with the one application.

In another example, a computer-readable storage medium is encoded with instructions for causing one or more programmable processors of a network device to receive a set of prefix lengths that include a number of different prefix lengths greater than a maximum number of different prefix lengths capable of being looked up in parallel by a Bloom filter of the network device, wherein the set of prefix lengths is associated with one application. The instructions also cause the one or more programmable processors to generate, based on the received set of prefix lengths, two or more groups of different prefix lengths, wherein each of the two or more groups of different prefix lengths includes no more than the maximum number of different prefix lengths, and program a filter lookup module of the network device with the two or more groups of different prefix lengths associated with the one application.

The techniques of this disclosure may provide several advantages. For example, the techniques provide a mechanism to maintain the number of different prefixes generated by a set of different prefix lengths to the number of different prefix lengths, which may reduce the number of prefixes that need to be searched. Further, the prefixes may be grouped such that, if a prefix is found in the first group, the remaining groups of prefixes need not be searched. By not creating additional prefixes to search and grouping the prefixes, the amount of time and processing power used when more different prefix lengths specified for a network address than the hardware or software performing the searches may be able to concurrently search is reduced. Thus, the techniques enable network devices to support large sets of prefix lengths while minimizing the performance penalty associated with processing prefixes generated from the large sets of prefix lengths.

The details of one or more examples are set forth in the accompanying drawings and the description below. Other features, objects, and advantages will be apparent from the description and drawings, and from the claims.

DETAILED DESCRIPTION

Figure 1:
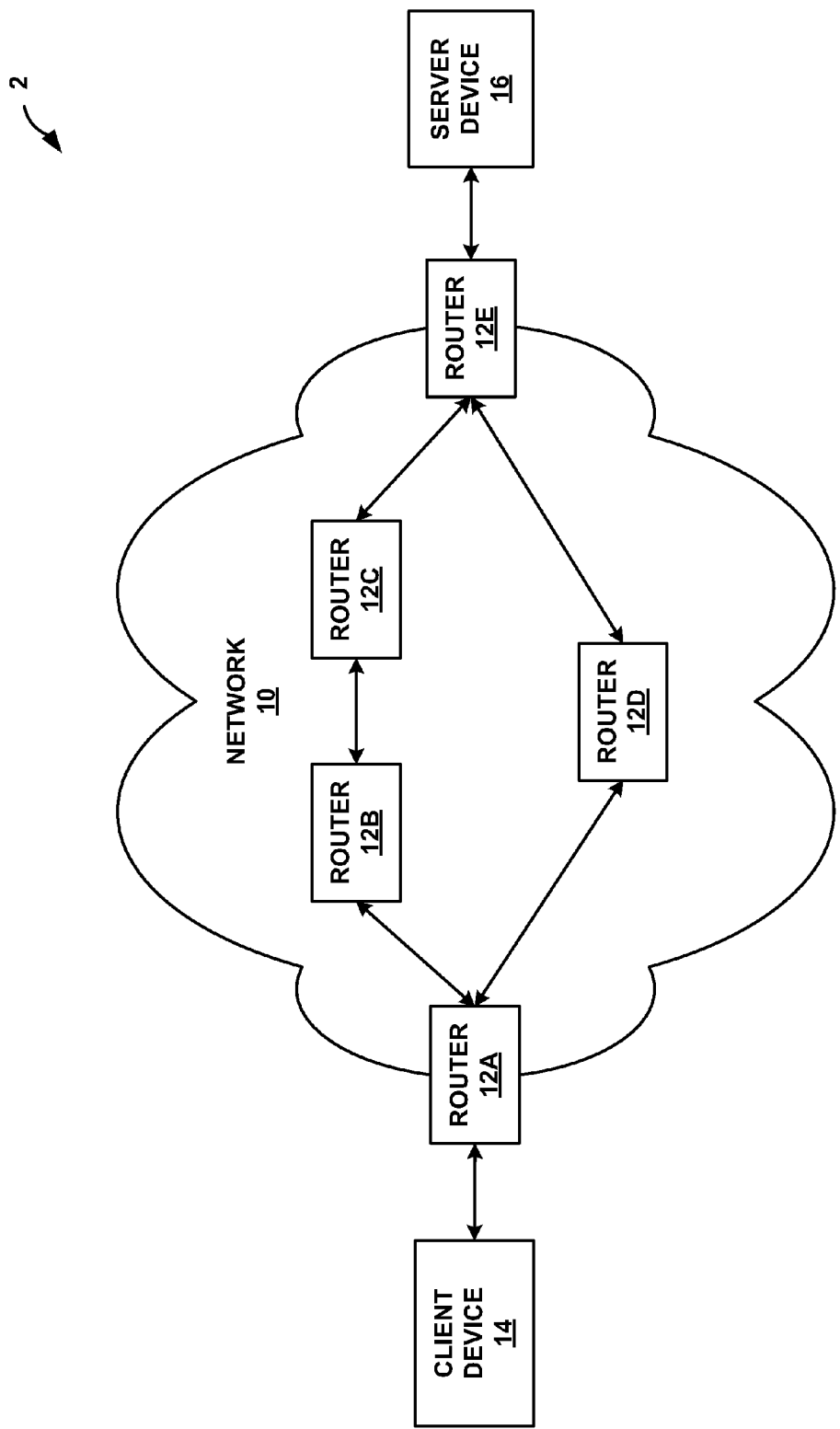
FIG. 1 is a block diagram illustrating an example system including a variety of network devices, any of which may implement the techniques of this disclosure.

FIG. 1 is a block diagram illustrating an example system 2 that includes a variety of network devices, any of which may implement the techniques of this disclosure. As illustrated in FIG. 1, system 2 includes network 10, client device 14, and server device 16. Network 10 includes routers 12A-12E (collectively, "routers 12") that facilitate the access of content between various network devices connected to network 10, including client device 14 and server device 16. While illustrated as including routers 12, in other examples, system 2 may include additional or alternative network devices, such as gateways, switches, hubs, firewall, intrusion detection/prevention (IDP) devices, and/or any other type of networking equipment or device that facilitates the transfer of data between the various network devices. Although described with respect to a router or other network device, any device that implements a longest prefix matching algorithm may implement the techniques described herein and the techniques should not be limited to routers or other network devices.

Network 10 enables transmission of content between network devices using one or more packet-based protocols, such as a Transmission Control Protocol/Internet Protocol (TCP/IP). In this respect network 10 may support the transmission of data via discrete data units, often referred to as "packets." As a result, network 10 may be referred to as a "packet-based" or "packet switched" network. While described in this disclosure as transmitting, conveying, or otherwise supporting packets, network 10 may transmit data according to any other discrete data unit defined by any other protocol, such as a cell defined by the Asynchronous Transfer Mode (ATM) protocol, or a datagram defined by the User Datagram Protocol (UDP).

Client device 14, in this example, represents a device that submits requests for services to server device 16. Server device 16, likewise, represents an example of a device that provides services to client device 14 in response to requests. Client device 14 and server device 16 may also participate in a bidirectional communication session, in which server device 16 requests services from client device 14, and client device 14 provides the requested services to server device 16. In this manner, client device 14 and server device 16 can each act as both a server and a client. Client device 14 may represent an endpoint device, such as a mobile device (e.g., a laptop computer, tablet computer, or cellular phone), a personal computer, a computing terminal, an Internet-capable television or device for providing Internet-based television services, or other such devices. Server device 16 may represent a web server, a file server, a peer device (e.g., another user's computing device), a database server, a print server, or other device from which a client device requests services.

Client device 14 submits requests to server device 16 via network 10. In the example illustrated in FIG. 1, client device 14 is communicatively coupled to router 12A. In other examples, client device 14 may be communicatively coupled to router 12A via additional network devices, such as access lines, wireless infrastructure and backhaul networks, and the like. Routers 12 of network 10 are configured to determine routes through network 10 to reach various destinations, such as server device 16. Routers 12 implement routing protocols to determine routes through network 10, as well as to share determined routes with other routers 12. In the example of FIG. 1, router 12A determines that two routes exist to reach server device 16. A first route beginning at router 12A to reach server device 16 includes router 12D, router 12E, and server device 16. A second route beginning at router 12A to reach server device 16 includes router 12B, router 12C, router 12E, and server device 16. In general, router 12A includes a control plane that executes routing protocols to learn the topology of network 10 and to select one of these routes over the other. Upon receiving data from client device 14 destined for server device 16, a data plane of router 12A performs a lookup function on keying information within the packet and forwards the data along the selected route.

Prior to forwarding a packet, routers 12 may apply one or more filters to the packet. In some examples, filters specify one or more conditions and a set of actions to be performed on packets that match the conditions. In various examples, the conditions specify one or more of a source Internet protocol (IP) address, a destination IP address, a source port, a destination port, a protocol, and/or other fields of a packet. The actions to perform may include one or more of appending a label to the packet (for multiprotocol label switching (MPLS) to tunnel the packet), removing or swapping a label on the packet, inspecting the packet for viruses, performing deep packet inspection on the packet, performing quality of service processing on the packet (e.g., prioritizing the packet over other packets), blocking or dropping the packet (e.g., when the source or destination associated with the packet have been determined to be malicious) or other services.

In some examples, the data plane implements a longest prefix match algorithm when forwarding an individual packet to identify one or more filters to apply to the packet. For example, the filters may be stored in a filter table and specify criteria to be matched against the packet, such as network prefix. Collectively, the criteria specified by the filters control which of the filters are to be applied to the packet by the data plane. As one example, router 12A may not necessarily be configured with a specific source or destination network address of an individual server device 16 (e.g., 10.1.1.8), but instead may be configured such that packets having a source or destination address matching a certain prefix (e.g., a range of addresses corresponding to the network prefix 10.1/16) are to have a certain filter applied to the packets by router 12A. In general, the data plane of router 12A uses the longest prefix match algorithm to identify the entry in the filter table that corresponds to the longest prefix that matches the key information of a received packet. Router 12A applies the set of filters specified in the entry of the filter table identified as storing the longest matching prefix that is satisfied by the key information of the received packet.

Routers 12, in some examples, use hashing units to identify filters that match a particular packet. In one example, the hashing unit supports prefix lengths (which act as key values in the hashing unit) from /0 to /128. Prefixes with lengths from /0 to /64, in some examples, consume a single cell of a bucket of the hashing unit, while prefixes with prefix lengths from /65 to /128 consume two consecutive cells, referred to as a double cell, in the hashing unit. Hash tables of the hashing unit, in some examples, physically support 64K single cells, with two cells per bucket. In some examples, if all prefixes are of single cells, each hash table can support loads of approximately 80% to 90% (e.g., 51,000 to 57,600 entries). In some examples, if all prefixes are of double cells, each hash table of the hashing unit can support loads of approximately 40% to 45% (e.g., 28,800 entries). The physical hash tables of a hashing unit may be referred to as key hash tables. In some examples, each key hash table has a capacity of approximately 16K cells and associated results. One example implementation of a hashing unit and corresponding hash tables is described by U.S. patent application Ser. No. 13/239,774, entitled "DYNAMICALLY ADJUSTING HASH TABLE CAPACITY," by Keen et al., filed Sep. 22, 2011, which is hereby incorporated by reference in its entirety.

When adding a value to the key hash table, the hashing unit stores the key value and an associated value in one of the cells of the bucket to which the key value maps. For example, with respect to the filters of router 12A, different length prefixes of source or destination network addresses act as key values, while associated values each represent the particular terms of the filter that match a particular key value. Accordingly, router 12A stores a destination address and an associated value in a cell of a bucket to which a hash function maps the destination address. The associated value may specify a network interface or particular terms of a filter that matches the destination address. By storing the prefixes in the cell, if two or more prefixes are mapped to the same bucket, router 12A can determine which of the cells stores the value associated with a particular length prefix.

In some examples, router 12A includes multiple hashing units to implement a Bloom filter. A Bloom filter is generally a data structure for storing an indication of whether a particular value has been stored (or been previously processed). In one example, a Bloom filter is a bit array that stores one 1-bit value at each entry of the array. The Bloom filter data structure is generally designed such that false negatives are avoided, while leaving open the (albeit small) possibility of false positives. That is, a well-designed Bloom filter can provide an indication of whether a particular value has not been stored, but in some cases may provide an incorrect indication that the value has been stored (when in fact, the value has not been stored).

When router 12A stores a key value in, e.g., the key hash table, router 12A adds the key value to the Bloom filter. In general, when a Bloom filter is queried with a particular value, the Bloom filter provides an indication of whether the value is stored in the Bloom filter. In one example, the lookup returns the value one if the particular value is stored in the Bloom filter and returns the value zero if the particular value is not stored in the Bloom filter. While false positives are possible when using a Bloom filter, false negatives are typically not possible, due to the design of the Bloom filter. Therefore, upon receiving a key value comprising a prefix of a source or destination address for a packet, router 12A first determines whether the key value is stored in the Bloom filter, and if so, determines whether the key value is actually stored in the key hash table.

In some examples, the Bloom filter may be implemented in hardware (e.g., when the bit array is stored in multiple memory banks) or in software. When implemented in hardware, router 12A may perform a look up for multiple keys in parallel, which may reduce the total number of clock cycles required to look up the keys. The number of controllers, queues, or other structures implemented in the Bloom filter may limit the number of keys that the Bloom filter can look up in parallel. For example, if a Bloom filter includes sixteen controllers, the Bloom filter can process up to sixteen different prefixes in parallel. If more than sixteen prefixes need to be processed, the additional prefixes need to wait until a subsequent clock cycle to be processed by the Bloom filter.

From time to time, the number of different prefix lengths may exceed the number of different prefix lengths that may be processed in parallel by the Bloom filter. That is, the number of address prefix lengths to be considered for matching may exceed the maximum set size supported by a hardware Bloom filter. In order to process all of the different prefix lengths, the number of different prefix lengths may be reduced by converting some shorter prefix lengths into longer prefix lengths, referred to herein as "prefix length expansion." For example, if the prefixes /9 through /24 may be processed in parallel by a hardware Bloom filter, but an additional prefix, e.g., /8, is also included in the set of different prefix lengths, the /8 prefix may be converted into two prefixes of length /9 (e.g., 12.00.00.00/8 may be converted into 12.00.00.00/9 and 12.128.00.00/9). However, the number of prefixes that may be generated using prefix length expansion increases exponentially such that every prefix of length /N yields $2^k$ prefixes when the length /N is expanded to /N+k. Furthermore, prefix length expansion is typically implemented in software, which is more complicated and cumbersome than hardware implementations.

Rather than performing prefix length expansion, techniques of this disclosure provide a mechanism to divide address prefix lengths into groups each having no more than the maximum number of prefix lengths supported by the Bloom filter. When an application requires more than the maximum number of prefix lengths supported by the Bloom filter to be processed for a given network address, a prefix lookup module of router 12A divides the prefix lengths into groups and maintains a pointer that points to the next group of prefix lengths to be processed for the network address. The prefix lengths may be split into any number of groups, each group having no more than the maximum number of prefix lengths supported by the Bloom filter. In one example, the different prefix lengths are grouped based on the length of each prefix and the groups are processed in an order determined by the length of the prefixes included in each group such that the first group to be processed includes the longest prefixes. By grouping the prefix lengths in this manner and processing the groups of prefix lengths in this manner, when a match is found for a longest prefix of the group currently being processed, the remaining groups need not be processed as the remaining groups only include shorter prefixes.

Though described primarily with respect to router 12A, it should be understood that the techniques of this disclosure may be implemented by any of routers 12, client device 14, service device 16, or any other computing device that would implement hashing functionality. Moreover, the techniques of this disclosure may be applied to other contexts and for other uses. For example, the techniques of this disclosure may also be applied by router 12A when performing packet lookup and forwarding. The data plane of router 12A may implement the longest prefix match algorithm when forwarding an individual packet to identify an entry of a forwarding information base (FIB) of the data plane that best matches the destination address of the packet. Router 12A, in various instances, stores the FIB in a hashing unit having a plurality of hash tables and implements one or more Bloom filters in conjunction with the hash tables. Router 12A may then apply techniques of this disclosure to programmatically configure the hashing unit of the FIB to dynamically bypass one or more of the Bloom filters.

Figure 2:
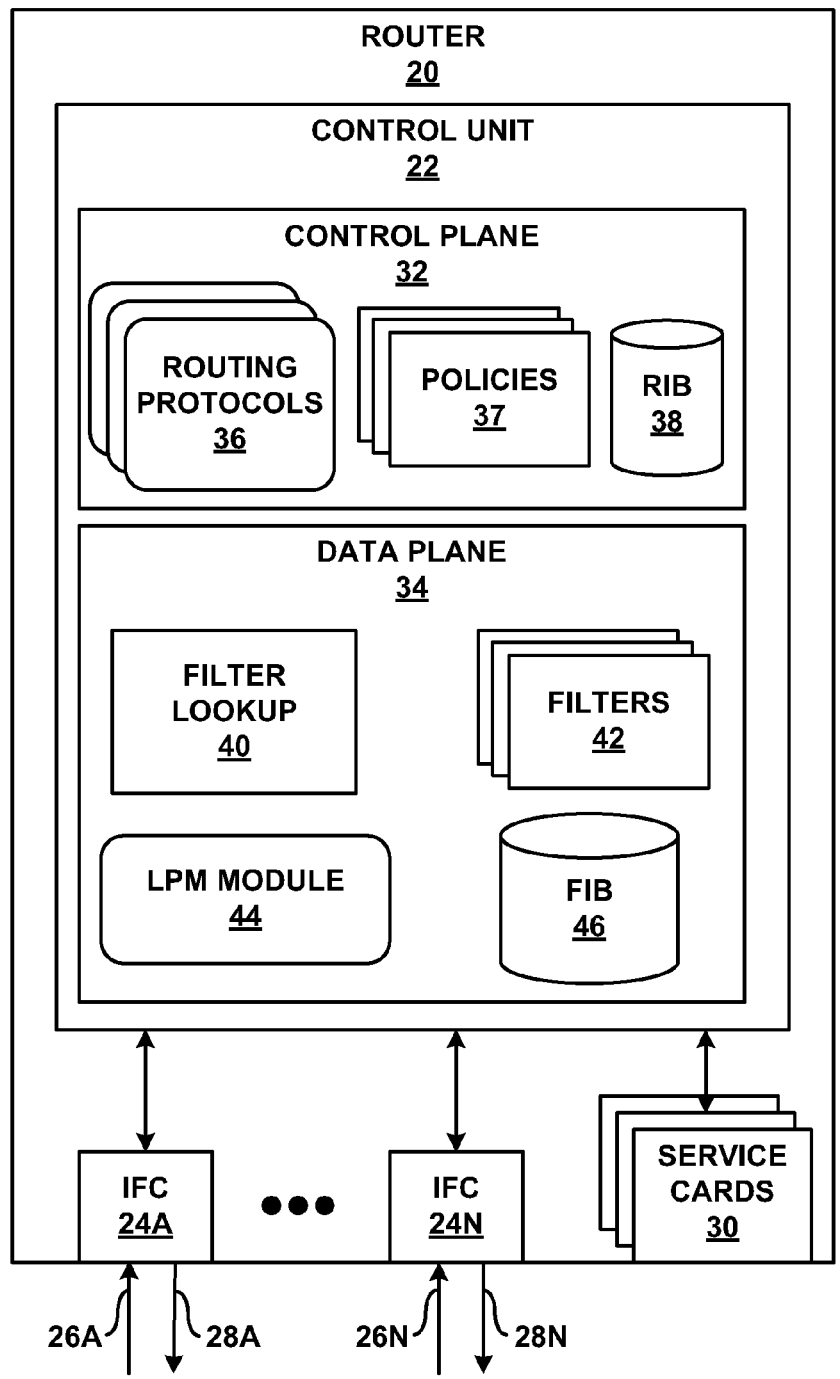
FIG. 2 is a block diagram illustrating an example router including a filter lookup block that is configured in accordance with one or more techniques of this disclosure.

FIG. 2 is a block diagram illustrating an example router 20 including a filter lookup block 40 that is configured in accordance with one or more techniques of this disclosure. For purposes of illustration, router 20 may be described below within the context of system 2 shown in the example of FIG. 1 and may represent any one of routers 12. In this example embodiment, router 20 includes control unit 22, interface cards (IFCs) 24A-24N (collectively, "IFCs 24"), and service cards 30.

Router 20 typically includes a chassis (not shown in the example of FIG. 2 for ease of illustration purposes) having a number of slots for receiving a set of cards, including IFCs 24 and service cards 30. Each card may be inserted into a corresponding slot of a chassis for communicably coupling the card to a control unit 22 via a bus, backplane, or other electrical communication mechanism. IFCs 24 send and receive packet flows or network traffic via inbound network links 26A-26N (collectively, "inbound links 26") and outbound network links 28A-28N (collectively, "outbound links 28"). Inbound links 26 and outbound links 28 in some examples for common IFCs form common, physical communication media for the IFCs, which operate in full duplex mode. That is, in some examples, each of IFCs 24 is coupled to respective communication media that can send and receive data substantially simultaneously. In other examples, inbound links 26 and outbound links 28 form separate physical media for respective IFCs 24.

Control unit 22 may include one or more processors (not shown in FIG. 2) that execute software instructions, such as those used to define a software or computer program, stored on a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 22 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 22 may also be divided into logical or physical "planes" to include a first control or routing plane 32, and a second data or forwarding plane 34. In some examples, control unit 22 may be further divided into a third logical or physical "plane," a service plane. That is, control unit 22 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations.

Control plane 32 of control unit 22 may provide the routing functionality of router 20. In this respect, control plane 32 may represent hardware or a combination of hardware and software of control unit 22 that implements routing protocols 36. Routing protocols 36 may include, for example, intermediate system to intermediate system (IS-IS), open shortest path first (OSPF), routing information protocol (RIP), border gateway protocol (BGP), or other routing protocols. By executing routing protocols 36, control plane 32 identifies existing routes through the network and determines new routes through the network. Control plane 32 stores routing information within routing information base (RIB) 38. The routing information may include information defining a topology of a network, such as network 10 of FIG. 1. Control plane 32 may resolve the topology defined by the routing information to select or determine one or more routes through network 10.

Control plane 32 may then update data plane 34 in accordance with these routes to program data plane 34 with forwarding information stored within forwarding information base (FIB) 46. The forwarding information associates keying information (e.g., IP addresses or IP prefixes or labels) with next hops (e.g., neighboring routers) and ultimately with output interfaces of router 20 coupled to outbound links 28. When forwarding a packet, data plane 34 processes a key extracted from the packet's header to traverse the forwarding information stored in FIB 46 and selects a next hop to which to forward the packet. Based on the selected next hop, data plane 34 identifies the set of one or more outbound links 28 that are coupled to the next hop.

Prior to forwarding a packet via one or more outbound links 28, data plane 34 may apply one or more filters to the packet. As illustrated in FIG. 2, data plane 34 includes a filter lookup block 40, filters 42, and a longest prefix match algorithm module (LPM MODULE) 44. Filters 42 include one or more filters defined for one or more different network address prefixes. In some examples, filters specify one or more conditions and a set of actions to be performed on packets that match the network address prefixes. The actions may include one or more of appending a label to the packet, removing or swapping a label on the packet, inspecting the packet for viruses, performing deep packet inspection on the packet, performing quality of service processing on the packet, blocking or dropping the packet or other services.

In general, longest prefix match algorithm module 44 implements the longest prefix match algorithm and is used by filter lookup block 40 to identify the terms of a filter 42 that match the network address for the longest defined prefix of the network address. According to the longest prefix match algorithm, a certain number of prefixes are generated from a network address. The number of prefixes generated from a network address may be configured by an administrator or may vary based on the type of network address used for the algorithm, as examples. In one example, sixteen or fewer prefixes, each having a different length, are generated based on the network address. One goal of the longest prefix match algorithm is to find the longest prefix having a match. In accordance with this goal, the hardware or software implementing the longest prefix match algorithm first performs a search for the longest prefix (i.e., the most specific prefix). If no match is found, a search is performed for the next longest prefix. This process is an iterative process that continues until a match is found or until a search has been performed for all possible prefixes.

Filter lookup block 40 stores the prefixes for which at least one filter is defined. In some examples, the prefix stored in filter lookup block 40 may be concatenated with the prefix length (e.g., the prefix 10.1 may be concatenated with the prefix length /16 for the entry "10.1/16" in filter lookup block 40). Filter lookup block 40 also generates a set of prefixes for each packet received by router 20 and searches for an associated value for each packet using the longest prefix match algorithm. That is, filter lookup block 40 performs searches on each of the generated prefixes, starting with the longest prefix and moving to the shortest prefix, in order, until a match is found. In one example, the longest prefix match may be performed by filter lookup block 40 on a source address (e.g., a source media access control address, a source IP address, or a source identifier) or a destination address (e.g., a destination media access control address, a destination IP address, or a destination identifier).

An administrator of router 20 may configure policies 37 that may be used by control plane 32 to programmatically configure the manner in which filter lookup block 40 performs the filter lookups. For example, control plane 32 may receive system performance information from data plane 34 that is reflective of the performance of filter lookup block 40. Based on policies 37 and the system performance information, control plane 32 configures filter lookup block 40 in a manner that, in various instances, may increase the performance of filter lookup block 40. That is, control plane 32 may select one of policies 37 to configure filter lookup block 40. One aspect of filter lookup block 40 configurable by control plane 32 includes the manner in which filter lookup block 40 groups different prefix lengths when an application is configured with more different prefix lengths than the maximum number of prefix lengths supported by the Bloom filter. Further details of filter lookup block 40 are described with respect to FIGS. 3-6.

Figure 3:
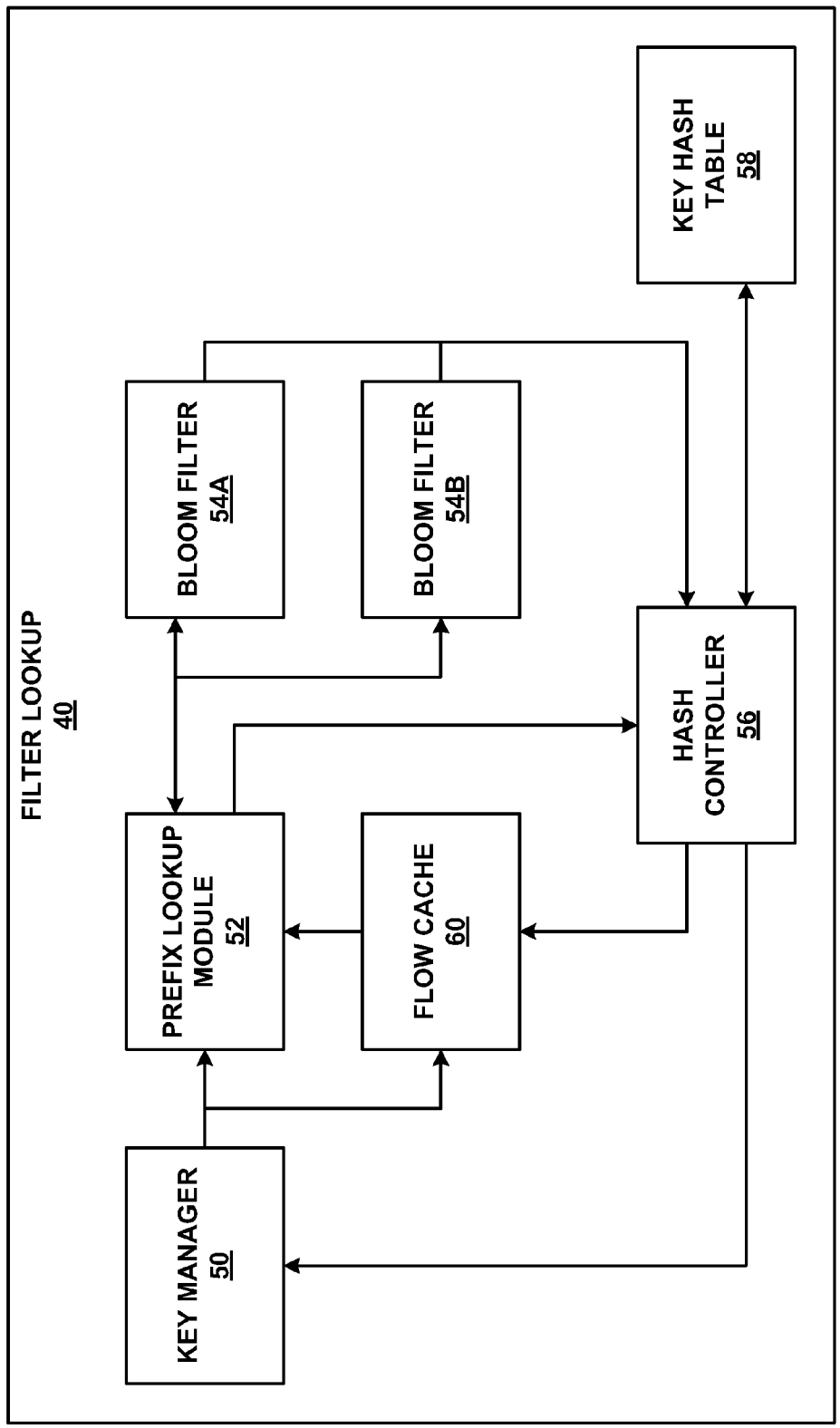
FIG. 3 is a block diagram illustrating an example filter lookup block of the router in greater detail.

FIG. 3 is a block diagram illustrating an example filter lookup block 40 of router 20 in greater detail. For purposes of illustration, filter lookup block 40 may be described below within the context of router 20 shown in the example of FIG. 2. In this example embodiment, filter lookup block 40 includes key manager 50, prefix lookup module 52, Bloom filters 54A and 54B (collectively, "Bloom filters 54"), hash controller 56, key hash table 58, and flow cache 60.

The entries of prefix lookup module 52, Bloom filters 54, key hash table 58, and flow cache 60 may be configured based on input received from an administrator interacting with router 20. For example, if the administrator configures a new filter on router 20, filter lookup block 40 stores one or more prefixes associated with the filter within key hash table 58 and adds entries in each of Bloom filters 54 to indicate that there are corresponding matching entries in key hash table 58 for the prefixes.

When configuring the new filter, control plane 32 of router 20 programs filter lookup block 40 and filters 42. Control plane 32, in various instances, is configured with the maximum number of different prefix lengths supported by filter lookup block 40. If the number of different prefix lengths configured for the new filter is greater than the maximum number of different prefix lengths supported by filter lookup block 40, control plane 32 programs prefix lookup module 52 with two or more different groups of different prefix lengths for the new filter as a linked list that includes pointers from one group to the next group. Preferably, control plane 32 orders the different prefix lengths in order from the longest prefix length to the shortest prefix length. That is, a first group of prefix lengths includes the longest prefixes that may return a match, a second group of prefix lengths includes the next longest prefixes that may return a match, and so on until there are no additional prefix lengths to divide into groups. By ordering and grouping the different prefix lengths in this manner, if a match is found for a particular prefix length, it must be the longest possible prefix match and any remaining prefix length groups for the network address need not be searched as the remaining prefix length groups only include shorter prefixes. One example implementation of a router in which a control plane programs a data plane is described by U.S. patent application Ser. No. 13/194,571, entitled "PACKET FORWARDING PATH PROGRAMMING USING A HIGH-LEVEL DESCRIPTION LANGUAGE," by Mackie et al., filed Jul. 29, 2011, which is hereby incorporated by reference in its entirety.

In general, when router 20 receives a packet, at least a portion of the information included in the packet is sent to filter lookup block 40. In one example, the source or destination network address included in the packet is sent to filter lookup block 40. Key manager 50 receives the information, generates a lookup key based on the information, and assigns a unique tag to the lookup key. The lookup key may be associated with multiple groups of prefix lengths. As each group of prefix lengths is processed by filter lookup block 40, the tag associated with the lookup key marks each group of prefix lengths as being associated with the lookup key. In some examples, the lookup key includes the destination network address included in the packet. In other examples, the lookup key may include any combination of the source network address, the destination network address, and the port number included in header information of the packet.

Key manager 50 sends a command and the lookup key to flow cache 60 to cause flow cache 60 to perform a lookup on the lookup key. In some examples, key manager 50 sends the lookup key to prefix lookup module 52 in parallel to sending the lookup key to flow cache 60. In general, flow cache 60 stores results for lookup keys that were previously looked up in filter lookup block 40. If flow cache 60 finds a match for the lookup key in a hash table of flow cache 60, flow cache 60 retrieves the stored result information associated with the lookup key and sends the result information to prefix lookup module 52. If flow cache 60 does not find a match for the key, flow cache 60 sends a message to prefix lookup module 52 indicating that a match was not found.

Prefix lookup module 52 processes the lookup key based at least in part on the result received from flow cache 60. For example, when flow cache 60 finds a match and sends the stored result information to prefix lookup module 52 as the result, prefix lookup module 52 does not generate a set of prefixes based on the lookup key. Instead, prefix lookup module 52 sends the result information received from flow cache 60 to hash controller 56.

When flow cache 60 does not find a match, prefix lookup module 52 sends a message to hash controller 56 that instructs hash controller 56 to initialize to zero at least a clock cycle counter for the lookup key and generates a set of prefixes using the lookup key. The number and the lengths of the prefixes generated from the lookup key are specified in prefix lookup module 52. The clock cycle counter increments for each clock cycle that elapses between when the clock cycle counter begins and when a match is found in key hash table 58 or it is determined that no match for the lookup key is located in key hash table 58 (e.g., because none of the prefixes generated from the lookup key were found in key hash table 58). In some examples, the clock cycle counter starts when prefix lookup module 52 sends the generated set of prefixes to Bloom filters 54.

Prefix lookup module 52 determines whether there is more than one group of different prefix lengths for the lookup key. The process of determining whether there is more than one group of different prefix lengths is discussed in more detail with respect to FIG. 4, below. If one group of different prefix lengths exists, prefix lookup module 52 generates a group of prefixes based on the one group of different prefix lengths and the lookup key. If two or more groups of different prefix lengths exist, prefix lookup module 52 generates a first group of prefixes based on the first group of different prefix lengths and the lookup key. In general, each prefix generated by prefix lookup module 52 includes the tag associated with the lookup key and an indication of whether additional groups of different prefix lengths exist for the lookup key.

After generating the set of prefixes specified in prefix lookup module 52, filter block 40 performs a lookup for the one or more of the generated prefixes in each of Bloom filters 54. That is, the full set of generated prefixes is looked up in Bloom filter 54A and in Bloom filter 54B. For each prefix looked up in each Bloom filter 54, a value is returned indicating whether the prefix was found in the respective Bloom filter 54. In one example, the value one indicates that the prefix was found and the value zero indicates that the prefix was not found. While shown in FIG. 3 as including two Bloom filters 54A and 54B, other examples of filter lookup block 40 may include one Bloom filter or more than two Bloom filters.

Hash controller 56 determines whether to perform a lookup in key hash table 58 for each prefix. Hash controller 56 examines the value returned from the Bloom filter lookup for each of the prefixes and identifies the longest prefix that may be included in key hash table 58. If both values returned from the lookups performed in Bloom filters 54A and 54B indicate that the prefix may be included in key hash table 58, hash controller 56 determines that the prefix may be included in key hash table 58. If either value returned from the lookups performed in Bloom filter tables 54A and 54B indicates that the prefix is not included in key hash table 58, hash controller 56 determines that the prefix is not included in key hash table 58. The likelihood of getting a false positive result for a single prefix from both Bloom filters is lower than if only one Bloom filter is used. Because hash controller 56 considers performing a lookup for a prefix in key hash table 58 only when the return values from both of Bloom filters 54 indicate that the prefix may be in the set, the number of unneeded or unsuccessful lookups performed on key hash table 58 may be reduced when two Bloom filters are used as compared to when one Bloom filter is used.

When hash controller 56 identifies at least one prefix that may be included in key hash table 58, hash controller 56 initializes a counter that counts the number of lookups that are performed in key hash table 58 until an outcome has been determined. Hash controller 56 identifies the longest prefix that may be in key hash table 58, performs a lookup in key hash table 58 using the identified prefix, and increments the key hash table lookup counter. When hash controller 56 performs the lookup, hash controller 56 applies a hash function to the prefix in order to identify the location in key hash table 58 at which the prefix should be located if the prefix is stored in key hash table 58. If the prefix is not found in key hash table 58 (e.g., because of a false positive indication received from the Bloom filter), hash controller 56 identifies the next longest prefix that may be in key hash table 58, performs a lookup in key hash table 58 using the next longest prefix, and increments the key hash table lookup counter. This process continues until a prefix is found in key hash table 58 or there are no more prefixes to lookup in key hash table 58.

When no match is found in key hash table 58 and the prefixes include an indication that additional groups of different prefix lengths for the lookup key are available for lookup, hash controller 56 sends a message to prefix lookup module 52 that includes a memory address at which to read the information for the next group of different prefix lengths and the tag for the lookup key. Prefix lookup module 52 reads the next group of different prefix lengths and generates the next set of prefixes based on the lookup key and the next group of different prefix lengths. The next set of generated prefixes includes the indication of the same tag that was included in the previous set of generated prefixes as the tag is associated with the lookup key and the next set of generated prefixes are generated using the lookup key.

Prefix lookup module 52 sends the next set of generated prefixes to Bloom filters 54 for lookup. Bloom filters 54 return a result for each of the different prefix lengths included in the next set of generated prefixes to hash controller 56. Hash controller 56 preforms a lookup in key hash table 58 for the longest prefix for which Bloom filters 54 indicated a possible match. If the prefix is not found in key hash table 58 (e.g., because of a false positive indication received from the Bloom filter), hash controller 56 identifies the next longest prefix that may be in key hash table 58, performs a lookup in key hash table 58 using the next longest prefix, and increments the key hash table lookup counter and so on until a prefix is found in key hash table 58 or there are no more prefixes to lookup in key hash table 58. The process of generating sets of prefixes based on groups of prefix lengths and the lookup key and preforming lookups for the generated sets of prefixes continues until a prefix is found in key hash table 58 or there are no more prefixes left to lookup in key hash table 58 and no more groups of different prefix lengths from which prefix lookup module 52 can generate additional sets of prefixes. In some examples, hash controller 56 maintains a sticky flag that is used to keep track of how many sets of prefixes are being generated by prefix lookup module 52 for a particular lookup key (i.e., based on the tag included in the prefixes). If more than a configurable maximum number of prefix sets for a particular lookup key are generated, hash controller 56 determines that an error occurred (e.g., an infinite loop) and returns an error condition.

When a match is found or there are no more prefixes to lookup in key hash table 58, hash controller 56 stops the clock cycle counter. Hash controller 56 sends the value of the clock cycle counter, the value of the key hash table lookup counter, the lookup key, and the result associated with the lookup key to flow cache 60 and sends a tag release message to key manager 50. The result associated with the lookup key includes the information returned from the lookup in key hash table 58 when a match was found or an indication that the lookup key is not found in key hash table 58 when a match was not found. The tag release message enables key manager 50 to reuse tags for various lookup keys. The same tag is not used for two or more different keys while the keys are being processed by filter lookup module 40. Rather, each tag is associated with a single lookup key and remains associated with the single lookup key until filter lookup module 40 completes processing the lookup key.

Flow cache 60 determines if the value of the clock cycle counter is greater than a configurable threshold or if the value of the key hash table lookup counter is greater than another configurable threshold. In examples where the value of the clock cycle counter is greater than the configurable threshold or where the value of the key hash table lookup counter is greater than the other configurable threshold, flow cache 60 identifies the lookup key as being eligible for storage in flow cache 60.

For packet flows that are eligible for storage in flow cache 60, flow cache 60 determines where to store the lookup key and result by at least applying a hash function to the lookup key. The hash result corresponds to a location (e.g., a bucket) within the hash table of flow cache 60. In one example, flow cache 60 is implemented as a hash table having 512 buckets each with 2 cells per bucket. The combination of the lookup key and the associated result consumes one cell. Thus, in this example, each bucket may store information about two packet flows and flow cache 60 may store information about 1024 packet flows.

In some instances, a lookup key and associated result may already be stored in one or both of the cells that correspond to the bucket identified by the hash result. Flow cache 60 may be programmatically configured to select which cell to store the lookup key and associated result using any number of different algorithms including random eviction and least recently used. In examples where flow cache 60 is programmed to use random eviction, flow cache 60 may include a shift register that generates a random number (e.g., a zero or a one) that corresponds to one of the two cells of the hash bucket. Flow cache 60 stores the lookup key and associated result in the cell that corresponds to the generated random number. In examples where flow cache 60 is programmed to use a least recently used algorithm to select the cell to store the lookup key and associated result, flow cache 60 maintains access information and marks cells as eligible to be replaced based on when the cell was last accessed. Flow cache 60 identifies the cell of the bucket that includes information that was least recently accessed or used by flow cache 60 and stores the new lookup key and associated result in the identified cell.

Figure 4:
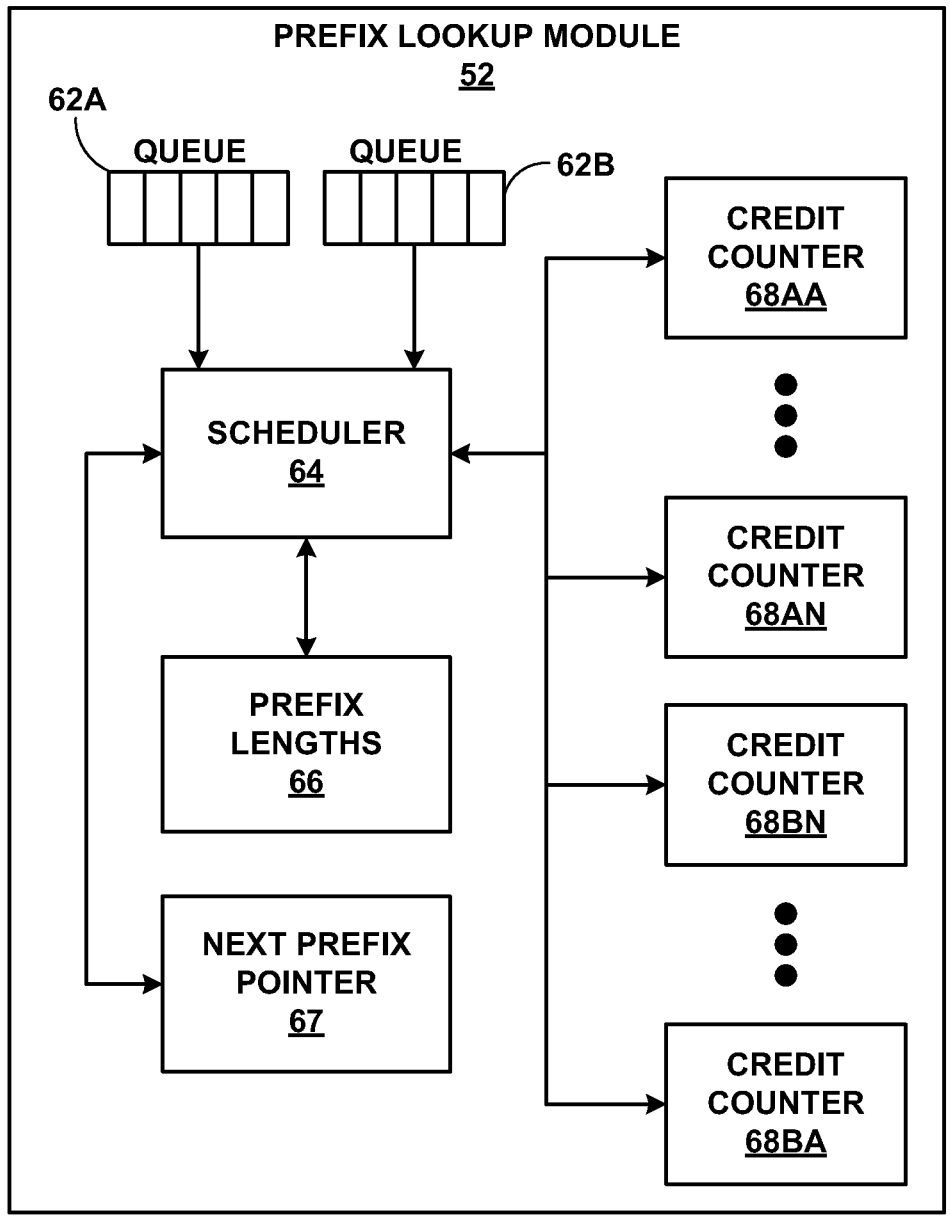
FIG. 4 is a block diagram illustrating an example prefix lookup module of the router in greater detail.

FIG. 4 is a block diagram illustrating an example prefix lookup module of the router in greater detail. For purposes of illustration, prefix lookup module 52 may be described below within the context of filter lookup block 40 shown in the example of FIG. 3 and router 20 shown in the example of FIG. 2. Prefix lookup module 52 is one example of a prefix lookup module of router 20. In other examples, router 20 may include a prefix lookup module having a different configuration. Prefix lookup module 52 includes queues 62A-62B (collectively, "queues 62"), scheduler 64, prefix lengths 66, next prefix pointer 67, credit counters 68AA-68AN (collectively, "credit counters 68A") and credit counters 68BA-68BN (collectively, "credit counters 68B").

In general, prefix lookup module 52 stores a set of prefix lengths in prefixes 66 for the longest prefix match key. The prefix lengths stored in prefix lengths 66 are determined at least in part by a software process executing within control plane 32. The prefix length indicates the number of upper bits of a mask-able key that should be used in comparison with the key hash table prefix. For example, a prefix length of /128 indicates that all 128 bits of a mask-able key should be used in comparison with the key hash table prefix. As another example, a prefix length of /64 indicates that the upper 64 bits of a mask-able key should be used in comparison with the key hash table prefix. Thus, the longest prefix is the prefix for which the most bits are used when comparing the prefix with the key hash table prefix (i.e., a prefix length of /128 is longer than a prefix length of /64).

When the software process executing within control plane 32 programs prefix lengths 66, the software process determines whether two or more groups of different prefix lengths need to be programmed. In some examples, the software process is configured with the maximum number of different prefix lengths supported by Bloom filters 54 (e.g., the maximum number of different prefix lengths that can be looked up in a single clock cycle by a respective Bloom filter 54). If more than the maximum number of different prefix lengths are required for a particular application, the software process may divide the different prefix lengths into two or more groups. In general, the software process minimizes the number of groups of different prefix lengths. For example, if there are between one and two times as many different prefix lengths than the maximum number of different prefix lengths, the software process divides the different prefix lengths into two groups. If there are between two and three times as many different prefix lengths than the maximum number of different prefix lengths, the software process divides the different prefix lengths into three groups, and so on.

The software process programs prefix lengths 66 with all of the prefix lengths required for a particular application and programs next prefix pointer 67 with an indication of a memory address for each respective group of prefix lengths programmed into prefix lengths 66. The combination of prefix lengths 66 and next prefix pointer 67 form a linked list of prefix length groups. When only one group of different prefix lengths is required for a particular application, the software process programs an entry of next prefix pointer 67 for the particular application with a value indicating that no additional prefix length groups exist (e.g., a null value). When two or more groups of different prefix lengths are required for a particular application, the software process programs each entry of next prefix pointer 67 for the particular application with an indication of where in prefix lengths 66 the next group of prefix lengths for the particular application are located (e.g., a memory address of the next group of prefix lengths). For the last group of different prefix lengths for the particular application, the software process programs the entry of next prefix pointer 67 with a value indicating that no additional prefix length groups exist for the particular application.

Each group of different prefix lengths may include a different number of prefix lengths. In one example, the maximum number of different prefix lengths is sixteen and an application requires twenty different prefix lengths. In this example, the software process may be configured to divide the different prefix lengths into a group of sixteen prefix lengths and a group of four prefix lengths. Alternatively, the software process may be configured to divide the different prefix lengths into two groups of ten prefix lengths. The number of prefix sizes included in each prefix length group may be automatically configured based on the hit rate for each group. That is, the software process may receive statistical information from filter lookup module 40 indicating how often a prefix is found in the first group of prefix lengths. The software process may adjust the number of prefixes included in each group in order to minimize the number of prefixes generated by prefix lookup module 52 for each successful lookup. For example, the software process may initially divide a group of twenty different prefix lengths into two groups of ten prefix lengths. However, if the number of successful lookups resulting from the first group of prefix lengths is not sufficient (e.g., below a threshold value), the software process may reconfigure prefix lookup module 52 to include more prefix lengths in the first group of prefixes, up to the maximum number of supported prefix lengths.

When prefix lookup module 52 receives a network address, the network address is placed in queue 62A. Queue 62A provides a temporary storage repository for one or more incoming network addresses. If, for example, prefix lookup module 52 stalls such that no lookup requests are sent to Bloom filters 54, queue 62A provides a buffer for the incoming addresses, which may minimize the number of network addresses that may be lost or dropped when prefix lookup module 52 stalls. When two or more groups of different prefix lengths are required for a particular application, the second, and subsequent, lookup requests for the network address are placed in queue 62B. In one embodiment, entries in queue 62B have strict priority over queue 62A such that, so long as at least one value is in queue 62B, the value is retrieved and processed before any network address that is stored in queue 62A. The values stored in 62B may include a network address or the memory address of the next group of different prefix lengths for a particular application, as examples.

Scheduler 64 provides the scheduling functionality of prefix lookup module 52. That is, scheduler 64 manages the generation of the prefixes from the received network addresses as well as the lookup requests for Bloom filters 54. Scheduler 64 retrieves a network address from queues 62 (e.g., based on a strict priority where queue 62B has strict priority over queue 62A) and generates a set of prefixes from the network address based on the prefix length control information specified in prefix lengths 66 and a corresponding entry in next prefix pointer 67. For example, at least one prefix of the set of prefixes generated from the network address includes an indication of whether or not additional groups of different prefix lengths are available for generating additional prefixes. The indication may be a null value (e.g., when no additional groups of different network prefixes exist) or a location in prefix lengths 66 of the beginning of the next group of different prefix lengths (e.g., a memory address).

In one example, according to the information stored in prefix lengths 66, scheduler 64 generates sixteen or fewer different prefixes from one network address. The generated prefixes each have a different length, such as /32, /24, /16, or /8, as non-limiting examples. Scheduler 64 generates the prefixes by masking the number of bits from the network address as indicated by the length of the prefix. For example, if the network address is 10.1.1.7 and the prefix length is /16, the generated prefix is 10.1/16, and if the prefix length is /24, the generated prefix is 10.1.1/24.

Once the prefixes are generated, scheduler 64 determines whether to issue lookup requests for the set of generated prefixes. Scheduler 64 retrieves values from credit counters 68A and 68B. Credit counters 68A and 68B keep track of how many prefixes have been sent to each queue of Bloom filters 54. In the examples illustrated in FIGS. 2-5, credit counters 68A correspond to Bloom filter 54A and credit counters 68B correspond to Bloom filter 54B. In particular, each credit counter of credit counters 68A corresponds to a queue of Bloom filter 54A (i.e., credit counter 68AA corresponds to queue 70A of Bloom filter 54A shown in FIG. 5). In other examples, prefix lookup module 52 may be configured with a single credit counter for each Bloom filter instead of a credit counter for each queue of each Bloom filter. In general, when prefix lookup module 52 sends a prefix to a queue, the corresponding credit counter is decremented. When the lookup in the Bloom filter table is completed, the corresponding credit counter is incremented. The starting value for each credit counter is the size of the corresponding queue in the Bloom filter. The details of Bloom filters 54 are described with respect to FIG. 5.

As one example, credit counter 68AA corresponds to a first queue of Bloom filter 54A having eight slots. The queue of Bloom filter 54A is configured to store lookup requests for particular prefix lengths. In this example, credit counter 68AA is initially set to the value eight, corresponding to the eight slots of the queue. When scheduler 64 issues a lookup request for the prefix length associated with the queue, the value stored in credit counter 68AA is decremented to the value seven. Once Bloom filter 54A performs the lookup, the value stored in credit counter 68AA is incremented to the value eight. If the queue fills up (e.g., eight lookup requests are issued for a prefix length without any being performed), the value stored in credit counter 68AA is zero. When value stored in credit counter 68AA is zero, it indicates that the queue of Bloom filter 54A associated with credit counter 68AA is full.

If scheduler 64 determines that the value of credit counter 68AA is zero, scheduler 64 may be configured to either bypass Bloom filter 54A or stall until the value of credit counter 68AA is greater than zero. When scheduler 64 "bypasses" a Bloom filter, scheduler 64 sends a message to hash controller 56 indicating that the prefix associated with the full queue was found in the Bloom filter having the full queue and does not issue a lookup request to the Bloom filter for the prefix. The message may be referred to as a Bloom filter lookup result. Typically, scheduler 64 bypasses the Bloom filter for just the prefix associated with the full queue. That is, scheduler 64 issues lookup requests for each of the prefixes associated with queues of the Bloom filter that are not full. If a queue of Bloom filter 54A for a prefix is full and the queue of Bloom filter 54B for the prefix is not full, scheduler 64, in some examples, issues a lookup request for the prefix to Bloom filter 54B, but not to Bloom filter 54A.

Scheduler 64 may be dynamically configured by software executing on router 20 (e.g., an operating system executing in control plane 32) or by an administrator. The software or administrator may configure scheduler 64 by, for example, setting a value of a control register. In one example, control plane 32 of router 20 programs the hardware of data plane 34 with a selected one of policies 37 to cause scheduler 64 to be programmatically configured to implement the selected one of policies 37. Prefix lookup module 52 stores policy configuration information that controls whether scheduler 64 dynamically bypasses one of more of Bloom filters 54. That is, prefix lookup module 52 stores the policy configuration information that corresponds to the manner in which scheduler 64 responds when a queue of a Bloom filter is full. The policy configuration information stored in prefix lookup module 52 changes when control plane 32 programs the hardware of data plane 34 to implement a different one of policies 37. In examples where there is one Bloom filter, scheduler 64 may be configured to either stall when a queue of the Bloom filter is full (e.g., when the credit counter for a queue is zero) or bypass the Bloom filter. In examples where there are two Bloom filters, scheduler 64 may be configured to stall when any queue of any Bloom filter is full, stall only when at least one queue in each Bloom filter is full, or bypass any Bloom filter having a full queue (i.e., never stall).

In examples where control plane 32 dynamically configures scheduler 64, control plane 32 may monitor system performance and configure prefix lookup module 52 with policy configuration information based on the system performance of router 20 and policies 37. For example, control plane 32 may receive real-time information on how much activity is being performed by filter lookup block 40, how many false positives are occurring with the current configuration, as well as other system performance measures. False positives occur when hash controller 56 determines that a prefix is the longest prefix having return values from both of Bloom filters 54 indicating that the prefix is stored in key hash table 58, but, when hash controller 56 performs a lookup on the prefix in key hash table 58, the prefix is not found.

In one example, if scheduler 64 is configured to never stall and the software detects a large number of false positives, control plane 32, in various instances, may change the configuration of scheduler 64 by programming the hardware of data plane 34 such that prefix lookup module 52 causes scheduler 64 to stall only when at least one queue in each Bloom filter is full or to stall whenever any queue of any Bloom filter is full. If scheduler 64 is configured to stall whenever any queue of any Bloom filter is full, but the software determines that the system performance is suboptimal, the software may, in various instances, reconfigure scheduler 64 to never stall or stall only when at least one queue in each Bloom filter is full. In this manner, control plane 32 may programmatically configure how scheduler 64 processes Bloom filter lookups when one or more queues of Bloom filters 54 are full.

Figure 5:
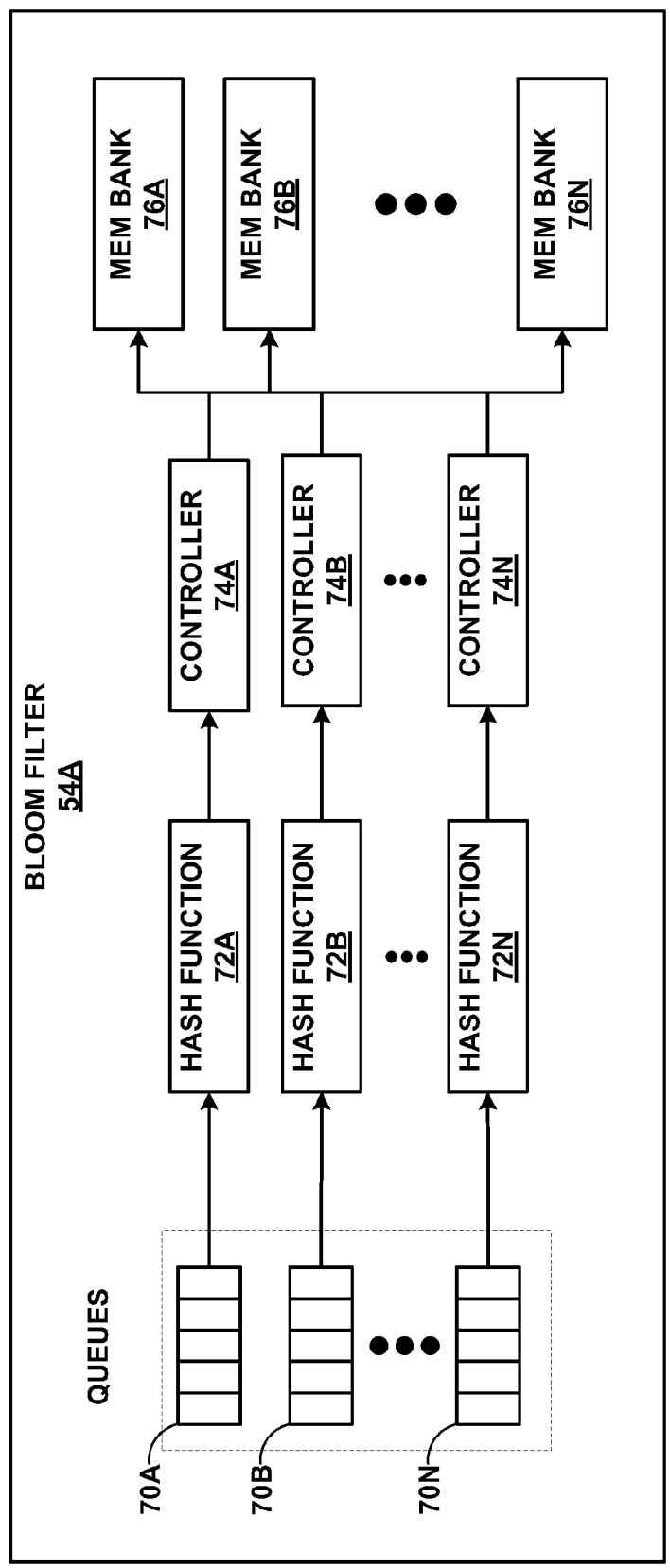
FIG. 5 is a block diagram illustrating an example Bloom filter of the router in greater detail.

FIG. 5 is a block diagram illustrating an example Bloom filter 54A of router 20 in greater detail. For purposes of illustration, Bloom filter 54A may be described below within the context of filter lookup block 40 shown in the example of FIG. 3 and router 20 shown in the example of FIG. 2. Bloom filter 54A is one example of a Bloom filter of router 20. In other examples, router 20 may include Bloom filters having a different configuration. Bloom filter 54A includes queues 70A-70N (collectively, "queues 70"), hash functions 72A-72N (collectively, "hash functions 72"), controllers 74A-74N (collectively, "controllers 74"), and memory banks (MEM BANK) 76A-76N (collectively, "memory banks 76").

Each of memory banks 76 is a separate hardware bank of memory that may each be accessed in parallel with other ones of memory banks 76. The data structure of Bloom filter 54A is stored in memory banks 76 such that the values indicating whether a prefix was likely stored in key hash table 58 or definitely not stored in key hash table 58 are stored across memory banks 76 based on the results of applying a hash function to each prefix associated with a filter. In one example, the number of memory banks 76 is the same as the number of queues 70. In another example, the number of memory banks 76 is greater than the number of queues 70 (e.g., 32 memory banks when there are 16 queues). By having more memory banks 76 than queues 70, the values may be spread across more memory banks, thus reducing the likelihood that two different prefixes will require lookups from the same one of memory banks 76. Reducing the number of prefixes that require lookups from the same one of memory banks 76 may increase the parallelism of the lookup operation and may decrease the buildup of prefixes in one or more of queues 70.

Bloom filter 54A receives a set of prefixes from prefix lookup module 52 and temporarily stores the prefixes in queues 70. Each of queues 70 is configured to store prefixes of a certain length. In one example, queues 70 includes sixteen queues where each queue is configured to store one of sixteen different length prefixes included in the set of prefixes received from prefix lookup module 52. For example, queue 70A may be configured to store the longest prefix length from a set of sixteen prefix lengths (e.g., prefixes of length /32), queue 70B may be configured to store the second longest prefix length from the set of sixteen prefix lengths (e.g., prefixes of length /24), and queue 70N may be configured to store the shortest prefix length from the set of sixteen prefix lengths (e.g., prefixes of length /2). While illustrated as each of queues 70 having five "slots" for storing prefixes, queues 70 may be configured with any amount of storage (e.g., any number of bytes) capable of having any number of "slots" for storing prefixes (e.g., four, eight, or twelve slots). The number of slots, in various instances, is equal to the initial value of the corresponding credit counter of prefix lookup module 52.

When Bloom filter 54A performs a lookup, Bloom filter 54A removes a set of prefixes from queues 70. In one example, queues 70 are configured as first-in-first-out queues such that when Bloom filter 54A removes a prefix from one of queues 70, Bloom filter 54A removes the prefix that was first added to the queue (i.e., the prefix that was in the queue for the longest period of time). Upon removing a prefix from each of queues 70, Bloom filter 54A applies a respective one of hash functions 72 to the prefix to generate a location within memory banks 76 (e.g., a memory address) in which to look for the prefix. Hash functions 72 may be implemented in hardware such that hash functions 72 include N different hardware implementations of the same hash function. In some examples, the number of hardware-implemented hash functions 72 equals the number of queues 70.

Each of hash functions 72 are the same hash function within a single Bloom filter, but may be different between Bloom filters. For example, the hash functions implemented in Bloom filter 54A may be different than the hash functions implemented in Bloom filter 54B. By implementing different hash functions in different Bloom filters, the likelihood that all of the Bloom filters will return a false positive is reduced as compared to implementing one hash function in multiple Bloom filters. By implementing one hash function 72 in hardware for each of queues 70, hash functions 72 may hash each of the set of prefixes in parallel.

The value generated by hashing the prefix is the index for the Bloom filter. The index is passed to the respective one of controllers 74. The index serves as a memory address. Controllers 74 perform a read from a memory bank 76 based on the index. In one example, controllers 74 examine the first five bits of the index to determine which one of memory banks 76 to use for the lookup. Controllers 74 may also be implemented in hardware and the number of controllers 74 may be the same as the number of queues 70. By implementing controllers 74 in hardware and implementing the same number of controllers 74 as the number of queues 70, controllers 74 may determine the appropriate one of memory banks 76 in which to perform the read from a memory bank 76 for the index value for each of the set of prefixes in parallel.

In some instances, two or more prefixes of a single set of prefixes may require a lookup in the same one of memory banks 76. In these instances, one lookup is typically performed on the one memory bank 76 in one clock cycle and the second lookup on the one memory bank 76 is performed in the next clock cycle. For example, if the first prefix is retrieved from queue 70A and the second prefix is retrieved from queue 70B and both prefixes require a lookup in memory bank 76B. In this example, controller 74A may perform a lookup on the first prefix in memory bank 76B in a first clock cycle and controller 74B may perform a lookup on the second prefix in memory bank 76B in the second clock cycle.

During the second clock cycle, Bloom filter 54A may retrieve another prefix from queue 70A because a lookup was performed on the previously retrieved prefix. In this manner, the lengths of each of queues 70 may be different. During the second clock cycle, prefix lookup module 52 may send an additional set of prefixes to Bloom filter 54A, which are then stored in queues 70. If several prefixes require a lookup from the same one of memory banks 76, one or more of queues 70 may fill up (i.e., hot banking).

After a lookup is performed by each of controllers 74, controllers 74 send the results of the lookups to hash controller 56 of filter lookup block 40. For example, when controller 74A completes a lookup for a prefix retrieved from queue 70A, controller 74A sends the result of the lookup to hash controller 56. The result of the lookup indicates whether the prefix is likely stored in key hash table 58 or is definitely not stored in key hash table 58.

Figure 6A:
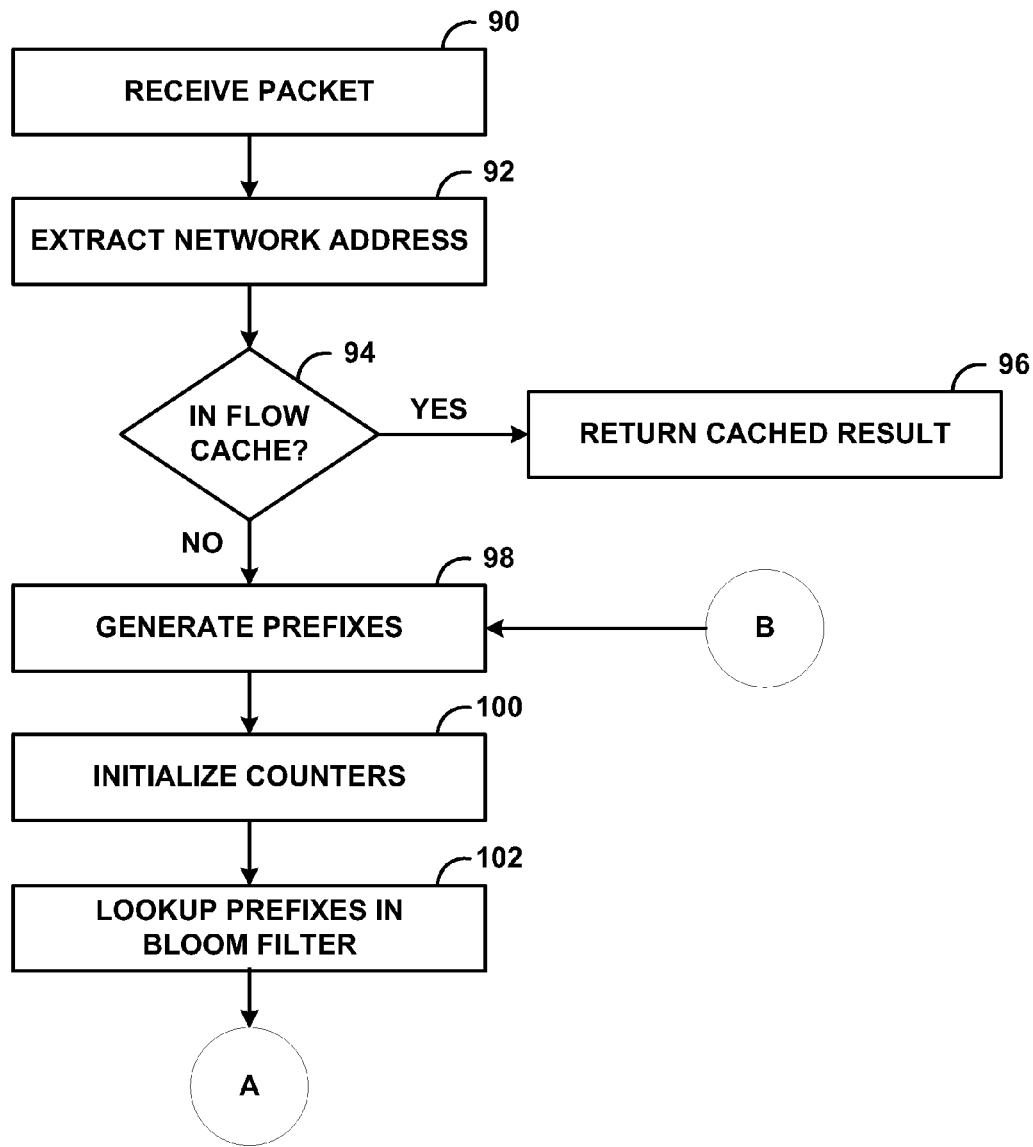
FIGS. 6A and 6B are flowcharts illustrating an example operation for performing a lookup in accordance with one or more techniques of this disclosure.
Figure 6B:
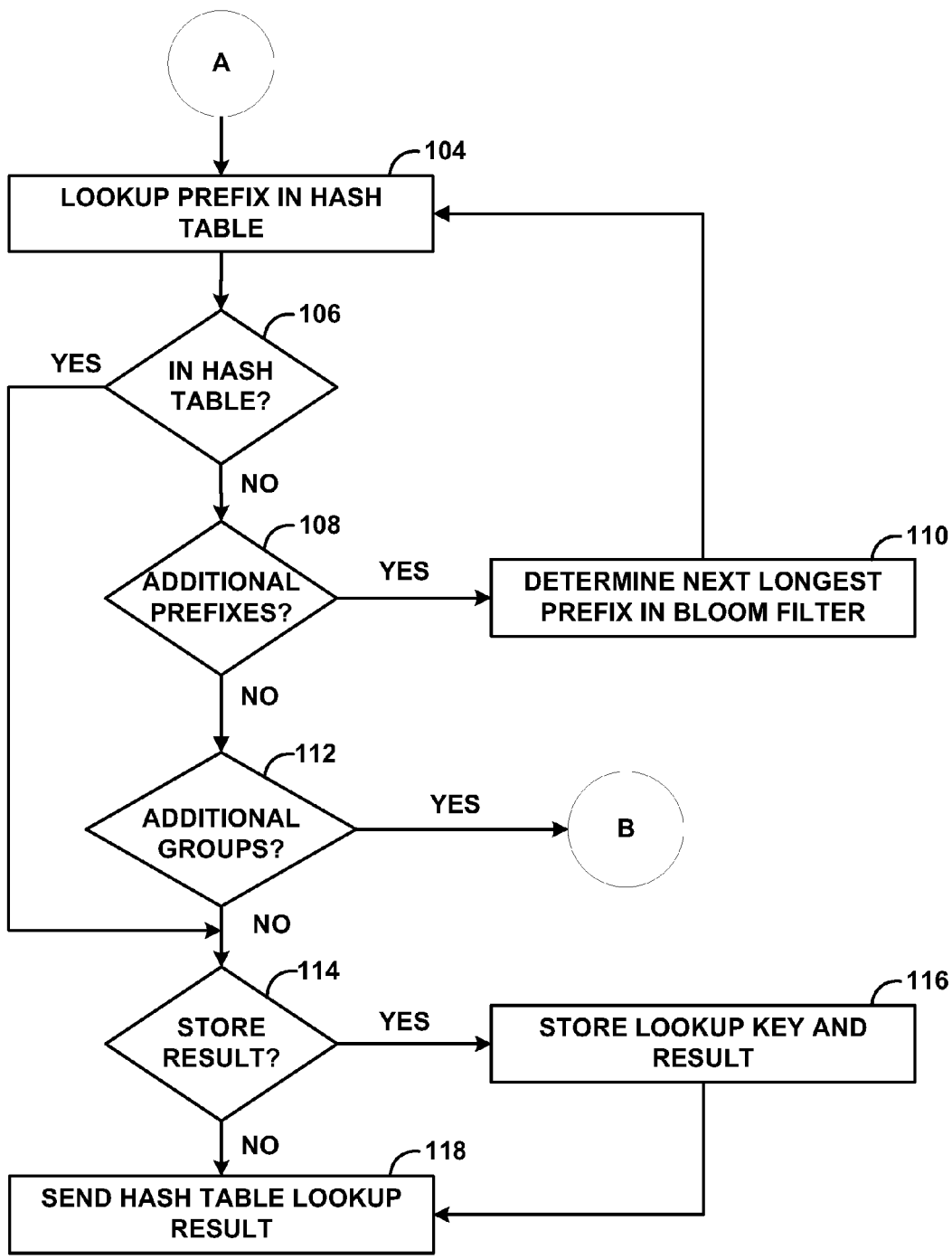

FIGS. 6A and 6B are flowcharts illustrating an example operation for performing a lookup in accordance with one or more techniques of this disclosure. For purposes of clarity, the method shown in FIGS. 6A and 6B will be described with respect to system 2 of FIG. 1, router 20 of FIG. 2, filter lookup block 40 of FIG. 3, prefix lookup module 52 of FIG. 4, and Bloom filter 54A of FIG. 5. Router 20 receives a packet via one of IFCs 24 and inbound links 26 from a device (e.g., client device 14 of FIG. 1) (90). Data plane 34 extracts information from the packet as key information (92). In some examples, the information is extracted from a header of the packet and may include a source or destination network address, a source or destination port, or a protocol.

Key manager 50 of filter lookup block 40 of router 20 receives the information, generates a lookup key based on the information, and sends the lookup key to flow cache 60 to determine whether the lookup key is located in flow cache 60 (94). Flow cache 60 performs a lookup to determine whether information about the packet flow identified by the lookup key is stored within flow cache 60. If a match for the lookup key is found in flow cache 60 ("YES" branch of 94), flow cache 60 outputs the lookup key and associated result to prefix lookup module 52 which, in turn, outputs the information to hash controller 56 for output to control plane 32 or data plane 34 (96). That is, when a match is found, filter lookup block 40 returns the cached result information to the appropriate hardware or software element of router 20.

If a match for the lookup key is not found in flow cache 60 ("NO" branch of 94), prefix lookup module 52 generates a set of prefixes based at least in part on the lookup key generated by key manager 50 and a group of different prefix lengths stored by prefix lengths 66 (98). The number and the lengths of the prefixes generated from the lookup key are specified in prefix lookup module 52. In one example, the prefix information stored in prefix lookup module 52 indicates that sixteen prefixes should be generated for a 32-bit IP address and the prefix lengths should be /2, /4, /6, /8, /10, continuing to /32. When generating the prefixes from the key information, prefix lookup module 52 masks a number of bits of the lower portion of the key information based on the prefix length. For example, if the prefix length is /8 and the key information is the 32-bit IP address 192.168.1.43, the prefix is 192/8 as the lower 24 bits of the IP address are masked with zeros. If the prefix length is /24, the prefix is 192.168.1/24. The prefixes include a tag that identifies the prefixes as being generated from the lookup key and an indication of whether additional groups of different prefix lengths exist for the lookup key.

Prefix lookup module 52 sends a message to hash controller 56 to initialize a clock cycle counter for the lookup key (100) and sends the generated set of prefixes to each of Bloom filters 54 for lookup (102). The clock cycle counter is incremented for each clock cycle that elapses between when the clock cycle counter is initialized and when a key hash table lookup result is obtained. Bloom filters 54 store each of the prefixes in a respective queue and, when performing a lookup, remove a prefix from each queue and apply one of hash functions 72 to the prefix to generate an index for the data structure of the Bloom filter 54 (102). The index, in one example, is a memory address of a location in a memory bank of the Bloom filter. Each of Bloom filters 54 implements a different hash function that is independent from the hash function implemented in the other Bloom filter 54. Using different hash functions may reduce the likelihood that a queue corresponding to the same prefix length is full in both Bloom filters 54. After the prefix is looked up in memory banks 76, Bloom filter 54A sends the result of the lookup to hash controller 56.

Once hash controller 56 has received a lookup result for each of the prefixes generated from the key information and for each of the Bloom filters 54, hash controller 56 determines the longest prefix of the prefixes that were indicated as being found in both Bloom filters 54. If either Bloom filter lookup result for a prefix indicates that the prefix was not found in the Bloom filter, the prefix is not in key hash table 58 and hash controller 56 discards the prefix from consideration. Hash controller 56 then performs a lookup on the longest prefix in key hash table 58 (104) and determines whether the longest prefix was found in key hash table 58 (106). Hash controller 56 maintains a key hash table lookup counter that counts the number of lookups in key hash table 58 that are performed for a particular lookup key before a result is obtained. If the longest prefix is not found in key hash table 58 ("NO" branch of 106), hash controller 56 increments the key hash table lookup counter and determines whether there are any additional prefixes to lookup in key hash table 58 (108). If there are additional prefixes to lookup ("YES" branch of 108), hash controller 56 determines the next longest prefix that was indicated as being found in both Bloom filters 54 (110) and performs a lookup in key hash table 58 using the next longest prefix (104) to determine if the next longest prefix is found in key hash table 58 (106). Hash controller 56 continues determining the next longest prefix (110), incrementing the key hash table lookup counter, and performing a lookup in key hash table 58 (104) until the prefix is found in key hash table 58 ("YES" branch of 106) or until all possible prefixes of the set of generated prefixes are looked up in key hash table 58 ("NO" branch of 108).

Hash controller 56 determines whether there are additional groups of different prefix lengths for the lookup key within prefix lengths 66 (112). In one example, hash controller 56 examines the indication of whether additional groups of different prefix lengths exist included with the prefix. If the indication is a null value, controller 56 determines that no additional prefix lengths exist for the lookup key ("NO" branch of 112). In some examples, hash controller 56 also determines whether a maximum number of prefix groups have been processed by filter lookup module 40 by, for example, checking a value of a loop counter included with the prefixes. Hash controller 56 decrements the loop counter after each group of prefixes is processed such that, once the loop counter reaches zero, hash controller 56 stops the lookup process ("NO" branch of 112).

If the indication is not a null value (e.g., a valid memory address) and the loop counter is not zero, hash controller 56 determines that additional prefix lengths exist for the lookup key ("YES" branch of 112) and sends the tag and the indication to prefix lookup module 52. Prefix lookup module 52 retrieves the next group of prefix lengths from prefix lengths 66 using the memory address specified in the indication, retrieves a possible next memory address for another group of different prefix lengths from next prefix pointer 67, and generates another set of prefixes based on the retrieved information and the tag received from hash controller 56 (98). The currently generated set of prefixes includes the same tag as the previously generated set of prefixes for the lookup key as both sets of prefixes are generated for the same lookup key. The currently generated set of prefixes also includes the information retrieved from next prefix pointer 67 as the indication of whether additional groups of different prefix lengths exist for the lookup key.

In some embodiments, prefix lookup module 52 sends a message to hash controller 56 to re-initialize the clock cycle counter for the lookup key (100). In other embodiments, the clock cycle counter continues counting for the lookup key. In either embodiment, hash controller 56 sends the currently generated set of prefixes to each of Bloom filters 54 for lookup (102). Hash controller 56 looks up the prefixes in key hash table 58 as described above (104, 106, 108, 110) and determines whether additional groups of prefix lengths exist for the lookup key (112) if a prefix is not found in key hash table 58 ("NO" branch of 106) and no additional prefixes of the next set of prefixes are left to lookup in key hash table 58 ("NO" branch of 108). As long as hash controller 56 determines that additional prefix lengths exist for the lookup key (i.e., the value of the loop counter is greater than zero and the indication of whether additional groups of prefix lengths exists is not null) ("YES" branch of 112), hash controller 56 sends the tag and the indication to prefix lookup module 52 and the process repeats.

If hash controller 56 determines that no additional groups of different prefix lengths are available for the lookup key ("NO" branch of 12), hash controller 56 determines whether to store the result of the lookup based on the clock cycle counter and the key hash table lookup counter (114). Hash controller 56 retrieves the values from the clock cycle counter and the key hash table lookup counter to determine how many clock cycles elapsed since prefix lookup module 52 began processing the key information and determine how many lookups in key hash table 58 were performed. Hash controller 56 sends the lookup key, the associated result obtained from key hash table 58, the value of the clock cycle counter, and the value of the key hash table counter to flow cache 60. Flow cache 60 determines whether the packet flow is eligible for storage within flow cache 60 based on the value of the clock cycle counter and the value of the key hash table lookup counter. If the value of the clock cycle counter is greater than the corresponding threshold value or if the value of the key hash table lookup counter is greater than the corresponding threshold value, flow cache 60 identifies the packet flow as being eligible for storage in flow cache 60 ("YES" branch of 114) and stores the lookup key and associated result (116). If the value of the clock cycle counter is not greater than the corresponding threshold value and if the value of the key hash table lookup counter is not greater than the corresponding threshold value, flow cache 60 identifies the packet flow as not being eligible for storage in flow cache 60 ("NO" branch of 114). In either instance, hash controller 56 outputs the key hash table lookup result to data plane 34 (118).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments of the invention have been described. These and other embodiments are within the scope of the following claims.

What is claimed is:

1. A method comprising:
   receiving, with a network device, a set of prefix lengths that include a number of different prefix lengths greater than a maximum number of different prefix lengths capable of being looked up in parallel by a Bloom filter of the network device, wherein the set of prefix lengths is associated with one application;
   generating, based on the received set of prefix lengths, two or more groups of different prefix lengths, wherein each of the two or more groups of different prefix lengths includes no more than the maximum number of different prefix lengths;
   programming, with a control plane of the network device, a filter lookup module of the network device with the two or more groups of different prefix lengths associated with the one application; and
   after programming the filter lookup module, sequentially processing, with the filter lookup module, respective sets of prefixes each generated using a corresponding one of the two or more groups of different prefix lengths until either 1) a match for a prefix from one of the different groups of prefixes is found in a hash table or 2) the filter lookup modules has processed the respective sets of prefixes generated for each of the two or more groups of different prefix lengths.

2. The method of claim 1, wherein programming the filter lookup module comprises:
   storing each of the two or more groups of different prefix lengths in a prefix lookup module of the filter lookup module; and storing a respective next prefix pointer value for each of the two or more groups of different prefix lengths in the prefix lookup module.

3. The method of claim 2, wherein the two or more groups of different prefix lengths and the respective next prefix pointer value for each of the two or more groups of different prefix lengths form a linked list.

4. The method of claim 1, wherein generating the two or more groups of different prefix lengths comprises grouping the different prefix lengths into the two or more groups such that a length of each respective prefix included in one group of the two or more groups is greater than a length of each respective prefix included in a subsequent group of the two or more groups.

5. The method of claim 1, wherein, after programming the filter lookup module, sequentially processing the respective sets of prefixes comprises:
   receiving, with a prefix lookup module of the network device, a lookup key;
   retrieving a first group of the two or more groups of different prefix lengths and a first next prefix pointer associated with the first group of different prefix lengths;
   generating, with the prefix lookup module, a first set of prefixes using the first group of different prefix lengths, wherein the first set of prefixes includes the first next prefix pointer as an indication of whether a second group of different prefix lengths exists within the two or more groups of different prefix lengths;
   processing, with the Bloom filter, each prefix of the first set of prefixes to identify a portion of the first set of prefixes to use in searching a hash table of the network device;
   searching, with a controller of the network device, the hash table using one or more of the identified portion of the first set of prefixes;
   receiving, with the controller, a first result of the search from the hash table; and
   if the first result indicates that at least one prefix of the first set of prefixes is stored within the hash table, outputting the result.

6. The method of claim 5, further comprising:
   for each set of prefixes generated by the prefix lookup module, adjusting, with the controller, a value of a loop counter; and
   if value of the loop counter equals a predetermined value, outputting an error as the result.

7. The method of claim 5, further comprising:
   if the first result indicated that all prefixes of the first set of prefixes are not stored within the hash table, determining, based on the indication of whether the second group of different prefix lengths exists within the two or more groups of different prefix lengths, that the two or more groups of prefixes include the second group of different prefix lengths;
   retrieving the second group of different prefix lengths and a second next prefix pointer associated with the second group of different prefix lengths;
   generating, with the prefix lookup module of the network device, a second set of prefixes using the second group of different prefix lengths, wherein the second set of prefixes includes the second next prefix pointer as an indication of whether a third group of different prefix lengths exists within the two or more groups of different prefix lengths;
   processing, with the Bloom filter, each prefix of the second set of prefixes to identify a portion of the second set of prefixes to use in searching the hash table of the network device;
   searching, with a controller of the network device, the hash table using one or more of the identified portion of the second set of prefixes;
   receiving, with the controller, a second result of the search from the hash table; and
   if the second result indicates that at least one prefix of the second set of prefixes is stored within the hash table, outputting the second result.

8. The method of claim 7, further comprising:
   if the second result indicated that all prefixes of the second set of prefixes are not stored within the hash table, determining, based on the indication of whether the third group of different prefix lengths exists within the two or more groups of different prefix lengths, that the two or more groups of prefixes include the third group of different prefix lengths;
   retrieving the third group of different prefix lengths and a third next prefix pointer associated with the third group of different prefix lengths;
   generating, with the prefix lookup module of the network device, a third set of prefixes using the third group of different prefix lengths, wherein the third set of prefixes includes the third next prefix pointer as an indication of whether a fourth group of different prefix lengths exists within the two or more groups of different prefix lengths;
   processing, with the Bloom filter, each prefix of the third set of prefixes to identify a portion of the third set of prefixes to use in searching the hash table of the network device;
   searching, with a controller of the network device, the hash table using one or more of the identified portion of the third set of prefixes;
   receiving, with the controller, a third result of the search from the hash table; and
   if the third result indicates that at least one prefix of the third set of prefixes is stored within the hash table, outputting the third result.

9. The method of claim 7, further comprising:
   if the second result indicated that all prefixes of the second set of prefixes are not stored within the hash table, determining, based on the indication of whether the third group of different prefix lengths exists within the two or more groups of different prefix lengths, that the two or more groups of prefixes do not include the third group of different prefix lengths; and
   outputting the second result.

10. The method of claim 1, wherein a first group of the two or more groups of different prefix lengths includes less than the maximum number of different prefix lengths, the method further comprising:
   receiving, with the control plane, statistical information that includes a number of positive results of searches of the hash table of prefixes generated with a prefix lookup module of the network device using a first group of the two or more groups of different prefix lengths, wherein positive results indicate that at least one of the prefixes generated using the first group of different prefix lengths was found in a hash table of the network device;
   determining whether the number of positive results is less than a threshold number; and
   responsive to determining that the number of positive results is less than a threshold number, generating two or more new groups of different prefix lengths, wherein each of the two or more new groups of different prefix lengths includes no more than the maximum number of different prefix lengths, and wherein a first new group of the two or more new groups includes more different prefix lengths than the first group of the two or more groups of different prefix lengths.

11. A network device comprising:
a hardware control unit comprising:
a filter lookup module comprising:
a Bloom filter that supports parallel lookup of a maximum number of different prefix lengths; and
a prefix lookup module that accesses the Bloom filter to determine a longest length prefix that matches an entry in a set of prefixes; and
a control plane configured to receive a set of prefix lengths that include a number of different prefix lengths greater than the maximum number of different prefix lengths supported by the Bloom filter, wherein the set of prefix lengths is associated with one application, generate, based on the received set of prefix lengths, two or more groups of different prefix lengths, wherein each of the two or more groups of different prefix lengths includes no more than the maximum number of different prefix lengths, and program the filter lookup module with the two or more groups of different prefix lengths associated with the one application,
wherein, after programming the filter lookup module, the filter lookup module sequentially processes respective sets of prefixes each generated using a corresponding one of the two or more groups of different prefix lengths until either 1) a match for a prefix from one of the different groups of prefixes is found in a hash table or 2) the filter lookup modules has processed the respective sets of prefixes generated for each of the two or more groups of different prefix lengths.

12. The network device of claim 11,
wherein in the filter lookup module further comprises a prefix lookup module, and
wherein the control plane is further configured to store each of the two or more groups of different prefix lengths in the prefix lookup module, and store a respective next prefix pointer value for each of the two or more groups of different prefix lengths in the prefix lookup module.

13. The network device of claim 12, wherein the two or more groups of different prefix lengths and the respective next prefix pointer value for each of the two or more groups of different prefix lengths form a linked list.

14. The network device of claim 11, wherein the control plane is further configured to group the different prefix lengths into the two or more groups such that a length of each respective prefix included in one group of the two or more groups is greater than a length of each respective prefix included in a subsequent group of the two or more groups.

15. The network device of claim 11,
wherein the filter lookup module further comprises:
a prefix lookup module;
a controller; and
a hash table,
wherein the prefix lookup module receives a lookup key, retrieves a first group of the two or more groups of different prefix lengths and a first next prefix pointer associated with the first group of different prefix lengths, and generates a first set of prefixes using the first group of different prefix lengths, wherein the first set of prefixes includes the first next prefix pointer as an indication of whether a second group of different prefix lengths exists within the two or more groups of different prefix lengths,
wherein the Bloom filter processes each prefix of the first set of prefixes to identify a portion of the first set of prefixes to use in searching the hash table, and wherein the controller searches the hash table using the identified portion of the first set of prefixes, receives a first result of the search from the hash table, and, if the first result indicates that at least one prefix of the first set of prefixes is stored within the hash table, outputs the result.

16. The network device of claim 15,
wherein the controller, if the first result indicated that all prefixes of the first set of prefixes are not stored within the hash table, determines, based on the indication of whether the second group of different prefix lengths exists within the two or more groups of different prefix lengths, that the two or more groups of prefixes include the second group of different prefix lengths,
wherein the prefix lookup module retrieves the second group of different prefix lengths and a second next prefix pointer associated with the second group of different prefix lengths, and generates a second set of prefixes using the second group of different prefix lengths, wherein the second set of prefixes includes the second next prefix pointer as an indication of whether a third group of different prefix lengths exists within the two or more groups of different prefix lengths,
wherein the Bloom filter processes each prefix of the second set of prefixes to identify a portion of the second set of prefixes to use in searching the hash table, and
wherein the controller searches the hash table using the identified portion of the second set of prefixes, receives a second result of the search from the hash table, and, if the second result indicates that at least one prefix of the second set of prefixes is stored within the hash table, outputs the result.

17. The network device of claim 16,
wherein the controller, if the second result indicated that all prefixes of the second set of prefixes are not stored within the hash table, determines, based on the indication of whether the third group of different prefix lengths exists within the two or more groups of different prefix lengths, that the two or more groups of prefixes include the third group of different prefix lengths,
wherein the prefix lookup module retrieves the third group of different prefix lengths and a third next prefix pointer associated with the third group of different prefix lengths, generates a third set of prefixes using the third group of different prefix lengths, wherein the third set of prefixes includes the third next prefix pointer as an indication of whether a fourth group of different prefix lengths exists within the two or more groups of different prefix lengths,
wherein the Bloom filter processes each prefix of the third set of prefixes to identify a portion of the third set of prefixes to use in searching the hash table, and
wherein the controller searches the hash table using one or more of the identified portion of the third set of prefixes, receives a third result of the search from the hash table, and, if the third result indicates that at least one prefix of the third set of prefixes is stored within the hash table, outputs the third result.

18. The network device of claim 16,
wherein the controller, if the second result indicated that all prefixes of the second set of prefixes are not stored within the hash table, determines, based on the indication of whether the third group of different prefix lengths exists within the two or more groups of different prefix lengths, that the two or more groups of prefixes do not include the third group, and outputs the second result.

19. The network device of claim 11, wherein a first group of the two or more groups of different prefix lengths includes less than the maximum number of different prefix lengths, wherein the control plane receives statistical information that includes a number of positive results of searches of the hash table of prefixes generated with a prefix lookup module of the network device using a first group of the two or more groups of different prefix lengths, wherein positive results indicate that at least one from of the prefixes generated using the first group of different prefix lengths was found in a hash table of the network device, determines whether the number of positive results is less than a threshold number, and, responsive to determining that the number of positive results is less than a threshold number, generates two or more new groups of different prefix lengths, wherein each of the two or more new groups of different prefix lengths includes no more than the maximum number of different prefix lengths, and wherein a first new group of the two or more new groups includes more different prefix lengths than the first group of the two or more groups of different prefix lengths.

20. A non-transitory computer-readable storage medium encoded with instructions that cause one or more programmable processors of a network device to:

receive a set of prefix lengths that include a number of different prefix lengths greater than a maximum number of different prefix lengths capable of being looked up in parallel by a Bloom filter of the network device, wherein the set of prefix lengths is associated with one application;

generate, based on the received set of prefix lengths, two or more groups of different prefix lengths, wherein each of the two or more groups of different prefix lengths includes no more than the maximum number of different prefix lengths;

program a filter lookup filter module of the network device with the two or more groups of different prefix lengths associated with the one application; and after programming the filter lookup module, sequentially processes respective sets of prefixes each generated using a corresponding one of the two or more groups of different prefix lengths until either 1) a match for a prefix from one of the different groups of prefixes is found in a hash table or 2) the filter lookup modules has processed the respective sets of prefixes generated for each of the two or more groups of different prefix lengths.

* * * * *